US008646760B2

(12) United States Patent
Ishman

(10) Patent No.: US 8,646,760 B2
(45) Date of Patent: Feb. 11, 2014

(54) CHASSIS MOUNTING SYSTEM

(75) Inventor: Scott A. Ishman, St. Petersburg, FL (US)

(73) Assignee: Honeywell International Inc., Morristown, NJ (US)

( * ) Notice: Subject to any disclaimer, the term of this patent is extended or adjusted under 35 U.S.C. 154(b) by 262 days.

(21) Appl. No.: 12/820,798

(22) Filed: Jun. 22, 2010

(65) Prior Publication Data
US 2011/0311332 A1 Dec. 22, 2011

(51) Int. Cl.
*F16F 13/00* (2006.01)
*F16F 9/20* (2006.01)

(52) U.S. Cl.
USPC .......................... 267/140.13; 267/34; 248/636

(58) Field of Classification Search
USPC ......... 267/140.11, 140.13, 120, 64.11, 64.13, 267/64.15, 136, 34; 296/1.03; 280/124.145, 280/124.155, 124.179; 188/312, 283
See application file for complete search history.

(56) References Cited

U.S. PATENT DOCUMENTS

| 2,572,919 | A | 10/1951 | French et al. |
| 3,273,095 | A | 9/1966 | Rossenbeck |
| 3,912,248 | A | 10/1975 | Pickford et al. |
| 4,066,278 | A * | 1/1978 | Takagi .................... 280/124.152 |
| 4,403,877 | A | 9/1983 | Jones et al. |
| 4,753,421 | A * | 6/1988 | Makibayashi et al. ... 267/140.13 |
| 6,557,675 | B2 | 5/2003 | Iannuzzelli |
| 6,752,389 | B2 | 6/2004 | Halladay et al. |
| 6,776,402 | B2 * | 8/2004 | Miyamoto et al. ............. 267/220 |
| 7,175,150 | B2 | 2/2007 | Chi |
| 7,552,916 | B1 | 6/2009 | Williams et al. |
| 2003/0197317 | A1 | 10/2003 | Meisel et al. |
| 2005/0271182 | A1 | 12/2005 | Somerville |
| 2009/0014930 | A1 | 1/2009 | Kuzukawa |
| 2010/0000950 | A1 | 1/2010 | Malekmadani |

FOREIGN PATENT DOCUMENTS

| CN | 1690468 A | 11/2005 |
| EP | 0 244 552 A1 | 11/1987 |
| GB | 674132 | 6/1952 |
| GB | 307849 | 1/1980 |
| JP | 54-55215 | 5/1979 |
| JP | 7-54918 | 2/1995 |
| WO | WO 2007058222 A1 * | 5/2007 |

* cited by examiner

*Primary Examiner* — Anna Momper
(74) *Attorney, Agent, or Firm* — Shumaker & Sieffert, P.A.

(57) ABSTRACT

An assembly includes a chassis coupled to a mounting surface via a mounting system. The mounting system includes a bolt, a dashpot, and a spring. The dashpot and the spring are configured to reduce vibration forces transferred from the mounting surface to the chassis. Techniques for forming the assembly are also described.

14 Claims, 7 Drawing Sheets

CHASSIS MOUNTING SYSTEM

TECHNICAL FIELD

The disclosure relates to mounting a chassis to a mounting surface.

BACKGROUND

In some applications, a printed board that is electrically connected to electrical components, such as central processing units (CPUs), application-specific integrated circuits (ASICs), field-programmable gate arrays (FPGAs), digital signal processors (DSPs), memory units, communication interfaces, and other types of integrated circuits, can be mounted to a chassis, which can provide a rigid framework for one or more printed boards. The chassis can be incorporated into a larger structure, such as a vehicle. For example, the chassis can be mounted to a surface within the vehicle in order to place the one or more printed boards within the vehicle. In some examples, mounting electronic components to a chassis prior to mounting the chassis within a larger structure can increase the structural integrity of the assembly and reduce the risk of individual electronic components becoming unfastened within the larger structure.

SUMMARY

The disclosure is directed to an assembly that includes a bolt, a dashpot, and a spring. The assembly is configured to couple a chassis to a mounting surface. The chassis may be configured to, for example, house one or more printed boards to which one or more electrical components are mechanically and/or electrically connected. The dashpot includes a fluid-filled chamber and a flange, and the fluid-filled chamber is movable relative to the bolt. The fluid-filled chamber and spring are configured to at least partially surround portions of the bolt. In some examples, the chassis is mechanically coupled to the fluid-filled chamber and in a substantially fixed position relative to the chamber. The configuration of the assembly reduces vibration forces transferred from the mounting surface to the chassis and helps dampen movement of the chassis relative to the mounting surface. The disclosure is also directed to techniques for forming an assembly that includes a bolt, a dashpot, and a spring, and coupling a chassis to a mounting surface via the assembly.

In one aspect, the disclosure is directed to an assembly that includes a bolt, a fluid-filled chamber, and a spring. The fluid-filled chamber at least partially surrounds a first portion of the bolt and is moveable relative to the bolt. The spring at least partially surrounds a second portion of the bolt.

In another aspect, the disclosure is directed to an assembly that includes a bolt, a dashpot, a spring, and a chassis. The dashpot includes a fluid-filled chamber that at least partially surrounds a first portion of the bolt. The spring at least partially surrounds a second portion of the bolt. The chassis is coupled to the fluid-filled chamber and the fluid-filled chamber and chassis are moveable relative to the bolt.

In another aspect, the disclosure is directed to a method that includes mechanically coupling a chassis to a dashpot via a bolt, the dashpot comprising a fluid-filled chamber, wherein the chassis and the chamber are configured to move relative to the bolt, and wherein the fluid-filled chamber at least partially surrounds a first portion of the bolt, and positioning the spring such that the spring at least partially surrounds a second portion of the bolt. In some examples, the method further comprises mechanically coupling the chassis to a mounting surface via the bolt.

In another aspect, the disclosure is directed to a system comprising means for dampening movement of a chassis relative to a mounting surface, where the means for dampening movement comprises a dashpot and a spring, and is mechanically coupled to the mounting surface and chassis via a bolt. In another aspect, the disclosure is directed to a system comprising means for mechanically coupling a chassis to a dashpot, the dashpot comprising a fluid-filled chamber, wherein the chassis and the chamber are configured to move relative to the means for mechanically coupling the chassis to the dashpot.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
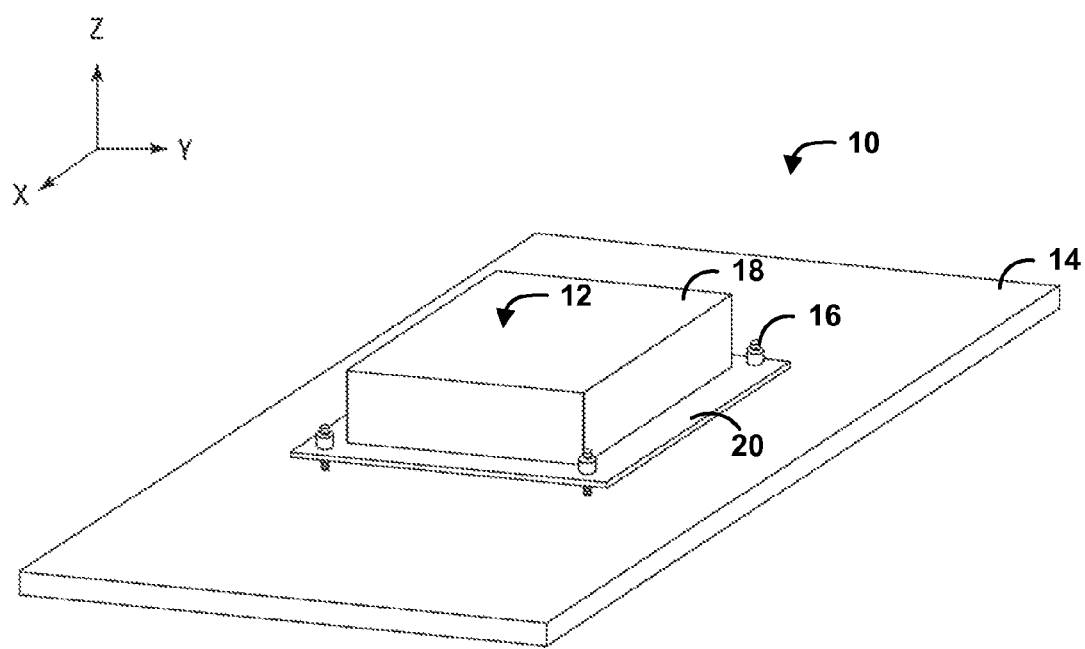
FIG. 1 is a schematic perspective view of an assembly that includes a chassis and a plurality of mounting systems for mounting the chassis to a mounting surface, each of the mounting systems including a bolt, a dashpot, and a spring.

In some applications, one or more printed boards (or other electronics cards) are housed within a chassis, and the chassis is mounted to a surface. In some examples, the mounting surface may be subjected to vibration forces, which can be transferred to the chassis at the interface between the mounting surface and the chassis. The electronic components electrically and mechanically coupled to a printed board that is housed within the chassis and mechanically coupled to the chassis may be sensitive to vibration forces, such that the performance and integrity of the components may be compromised as a result of exposure to vibration forces. The vibration forces may, for example, cause the chassis and associated electrical components to move relative to the mounting surface, and the force of the movement may result in disruption of one or more electrical connections between an electrical component and a printed board.

In some examples, the chassis that supports one or more printed boards may be mounted to a surface within an aircraft. The aircraft may generate vibration forces as a result of movement, e.g., acceleration, of the aircraft. For example, the aircraft may experience a g-force resulting from the aircraft's acceleration in opposition to gravity. In some examples, relatively high g-forces can cause stresses and strains on an aircraft and its components, such as the chassis and respective printed boards. The stresses and strains generated by the movement of the aircraft or other vehicles to which a chassis is mounted may adversely affect performance of the electrical components electrically and mechanically connected to the printed boards mechanically coupled to the chassis.

In some conventional configurations, a chassis to which one or more printed boards are attached may be directly mounted to the mounting surface via a solid connection, e.g., using a screw or a bolt. In these examples, substantially all of the mechanical forces exerted on the mounting surface (e.g., the surface to which the chassis is mounted) are directly transferred to the chassis and the electronic components. The mechanical forces can include vibration forces, e.g., g-forces, that can, in some examples, compromise the performance and integrity of the electronic components, as well as the integrity of the electrical connections between the electronic components and the printed board.

In other conventional configurations, the chassis may be mounted such that a bushing is positioned between the chassis and the mounting surface in order to provide an interface between the chassis and the mounting surface. The bushing may be formed from a material, e.g., rubber, that can absorb some of the vibration forces transferred from the mounting surface to the chassis. However, the bushing may be capable of dissipating only a portion of the energy transferred from the mounting surface to the chassis. Additionally, depending upon the material from which the bushing is made, the bushing may deteriorate as a result of particular environmental factors, e.g., varying temperature or the amount of friction and force to which the bushing is subjected.

The assemblies described herein include a chassis and a mounting system that may reduce the effects of vibration forces on the chassis compared to the conventional configurations. The mounting system includes a bolt, a dashpot, and a spring. The dashpot includes at least two elements, one of which surrounds a portion of the bolt that mechanically connects the chassis to a mounting surface and is movable with respect to the bolt. The spring surrounds another portion of the bolt. The bolt can be attached to a mounting surface such that the chassis is coupled to the mounting surface but is mechanically isolated from the mounting surface and from vibration forces transmitted through the mounting surface via one or both of the dashpot and spring. The dashpot and spring are configured to dampen (e.g., dissipate) vibration forces transferred from the mounting surface to the chassis and limit movement of the chassis, which may be useful for minimizing any adverse effects to electrical components of the printed boards and electrical connections of the electrical components mechanically coupled to the chassis from the vibration forces transmitted to the chassis via the mounting surface.

In some examples, the dashpot and at least one spring are positioned on opposite sides of the chassis, while in other examples, the dashpot and at least one spring are positioned on the same side of the chassis. In some examples, the dashpot and/or at least one spring can be positioned between the chassis and the mounting surface.

FIG. 1 illustrates an assembly 10 that includes a chassis 12 coupled to a mounting surface 14 via four mounting systems 16. Each of the mounting systems 16 includes a bolt, a dashpot, and a spring. In the example illustrated in FIG. 1, mounting systems 16 are configured to reduce vibration forces transferred from mounting surface 14 to chassis 12.

In the example illustrated in FIG. 1, chassis 12 houses one or more printed boards that each include one or more electronic components, e.g., circuit components, central processing units (CPUs), application-specific integrated circuits (ASICs), field-programmable gate arrays (FPGAs), digital signal processors (DSPs), memory units, communication interfaces, other types of integrated circuits, and the like. Chassis 12 defines enclosure 18 that substantially surrounds the printed boards in order to minimize interaction between the electronic components and the external environment. In the example illustrated in FIG. 1, enclosure 18 is a substantially rectangular compartment defined by the outer surfaces of chassis 12. In other examples, enclosure 18 may be a compartment of a different shape, e.g., a square or a cylinder. In some examples, enclosure 18 may only partially surround the electronic components. For example, enclosure 18 may be a surface to which the electronic components are mounted, but may not entirely surround the electronic components, e.g., may contact the electronic components on only one or two sides of enclosure 18.

In addition to supporting one or more printed boards, chassis 12 can minimize exposure of electronic components mounted to the printed boards to external factors, such as moisture, contaminants, or other environmental contaminants, mechanical forces, and the like, which may adversely affect the electronic components. For example, chassis 12 may be formed from a particular material that can protect the electronic components. In some examples, chassis 12 can be formed from substantially rigid materials, such as rigid plastics, metals, or wood. As an example, chassis 12 may be constructed from a rigid metal such as steel or aluminum in order to protect the electronic components housed within chassis 12 from some external factors such as large mechanical forces. That is, chassis 12 may be mounted in an environment in which large mechanical forces can come into contact with chassis 12. In order to minimize adverse affects resulting from the forces, e.g., bending, denting, scratching, compression, or breakage of chassis 12, chassis 12 may be constructed from a particular material, e.g., steel or aluminum, that can substantially absorb the forces and reduce the effect of the forces on chassis 12 and, consequently, on the electronic components housed within chassis 12.

In some examples, chassis 12 may be mounted in an environment in which chassis 12 is exposed to environmental factors, such as moisture or contaminants. In these examples, chassis 12 may be constructed from a particular material that minimizes the effects of these environmental factors on chassis 12 and printed boards supported by chassis 12. For example, chassis 12 may be constructed from a non-corroding material, e.g., a non-corroding metal or plastic. In this way, chassis 12 can protect electronic components housed within chassis 12 from external factors such as moisture or contaminants.

In addition, in some examples, at least some of the electronic components mounted on the printed boards may generate heat, and chassis 12 may help transfer heat away from the printed boards. For example, the printed boards may be mechanically coupled to chassis 12 such that a thermally conductive pathway is defined between chassis 12 and the printed boards. In this way, heat may be conducted away from the heat-producing electronics on the printed boards, thereby cooling the heat-producing electronics. Additionally, in some examples, thermally conductive straps may be connected between chassis 12 and mounting surface 14 in order to help dissipate heat created by the printed boards within chassis 12 away from chassis 12. In some examples, the thermally conductive straps can be formed from a flexible material in order to reduce strain on chassis 12 and/or mounting surface 14.

In addition to providing a housing for electronic components, chassis 12 is configured to be mounted to mounting surface 14. In this way, the printed boards housed by chassis 12 can be mounted to the mounting surface 14 via chassis 12. In the example illustrated in FIG. 1, chassis 12 includes mounting flange 20 to facilitate mounting of chassis 12 to mounting surface 14. In some examples, mounting flange 20 is configured to accept mounting systems 16, and mounting systems 16 mechanically couple chassis 12 to mounting surface 14.

In the example illustrated in FIG. 1, mounting flange 20 is a portion of chassis 12 that extends outward from the bottom surface of chassis 12 in all directions. The bottom surface of chassis 12 is defined as the surface of chassis 12 with the smallest z-axis position. (Orthogonal x-y-z axes are shown in FIG. 1 for ease of description only.) As illustrated in FIG. 1, mounting flange 20 defines a substantially rectangular rim around the bottom surface of chassis 12, and each of mounting systems 16 is positioned within mounting flange 20 at one of the four corners of mounting flange 20. (Although only three mounting systems 16 are visible from the perspective of FIG. 1, it is to be understood that assembly 10 includes four mounting systems 16, with each of mounting systems 16 positioned at one of the four corners of mounting flange 20.)

In other examples, mounting flange 20 may have another configuration suitable for accepting mounting systems 16. For example, mounting flange 20 may include one or more separate components that are positioned on one or more sides of a surface of chassis 12. That is, mounting flange 20 may not be a continuous structure positioned around the bottom surface of chassis 12. Instead, mounting flange 20 may include one or more separate extensions 20 positioned on one or more separate sides around of chassis 12. Alternatively, in some examples, chassis 12 does not include mounting flange 20, but is configured in another manner such that chassis 12 can be coupled to mounting surface 14 via mounting systems 16.

In the example illustrated in FIG. 1, mounting flange 20 and enclosure 18 are coupled together to define chassis 12. In some examples, chassis 12 is constructed as a single, integral unit, e.g., via molding. In other examples, chassis 12 can be formed by mechanically coupling two or more portions together. For example, in some examples, enclosure 18 and mounting flange 20 are formed separately and subsequently coupled together, e.g., via welding in examples in which enclosure 18 and mounting flange 20 are formed from metal materials or other weldable materials. Mounting flange 20 is constructed from a material that can sustain some mechanical forces resulting from coupling of chassis 12 to mounting surface 14 via mounting systems 16.

Mounting surface 14 can be any surface to which chassis 12 is coupled. In some examples, mounting surface 14 is formed from a rigid material, e.g., a rigid plastic, metal, or wood. Mounting surface 14 can be a portion of a larger entity, e.g., a wall of a building or a surface within a vehicle, such as an aerial vehicle or a ground vehicle. In some examples, mounting surface 14 sustains high vibration forces, which may be a result of external factors in the environment in which mounting surface 14 is located. For example, mounting surface 14 may be a rigid surface within an aircraft that experiences high g-forces as a result of the acceleration of the aircraft in opposition to gravity. The high g-forces sustained by the aircraft can result in high vibration forces applied to portions of the aircraft, such as mounting surface 14. The high vibration forces can be transferred to any component in contact with mounting surface 14, such as chassis 12.

In some examples, chassis 12 houses electronic components that are sensitive to vibration forces. For example, chassis 12 may house sensors or other equipment that can malfunction if exposed to vibration forces. In order to minimize the amount of vibration forces sustained by chassis 12, e.g., transferred from mounting surface 14 to chassis 12, assembly 10 includes four mounting systems 16, which couple chassis 12 to mounting surface 14. Mounting systems 16 are each configured to dampen at least some of the vibration forces transferred to chassis 12 from mounting surface 14.

In the example shown in FIG. 1, each of mounting systems 16 is positioned near one of four corners of chassis 12 in order to couple chassis 12 to mounting surface 14. In other examples, fewer than four mounting systems 16, e.g., one, two, or three mounting systems 16, may be used to couple chassis 12 to mounting surface 14, and the mounting systems 16 may be coupled to chassis 12 at locations other than locations near corners (if present) of chassis 12. In yet other examples, more than four mounting systems 16, e.g., five, ten, twenty, or thirty mounting systems 16, may be used.

Mounting systems 16 may be positioned on or near any portion of chassis 12 that facilitates suitable coupling of chassis 12 to mounting surface 14. In some examples, the placement and number of mounting systems 16 is dependent upon the configuration and shape of chassis 12. That is, although chassis 12 is illustrated in FIG. 1 as defining a substantially rectangular shape, in other examples, chassis 12 has another configuration and, consequently, mounting systems 16 may be positioned in a configuration different than the configuration illustrated in FIG. 1. For example, if chassis 12 defines a substantially cylindrical object and mounting flange 20 extends from around the bottom surface of chassis 12 in a substantially circular shape, mounting systems 16 may be positioned at various points on mounting flange 20 around the outer perimeter of chassis 12.

Each of mounting systems 16 includes a bolt, a dashpot, and a spring. The bolt, dashpot, and spring work in combination to reduce the magnitude of vibration forces transferred from mounting surface 14 to chassis 12. The dashpot and spring form a damping system that is capable of dissipating vibration forces sustained by mounting surface 14, which minimizes the vibration forces transferred to chassis 12. Each mounting system 16 serves as an isolation system that is dedicated to isolating chassis 12 from mounting surface 14.

Figure 2:
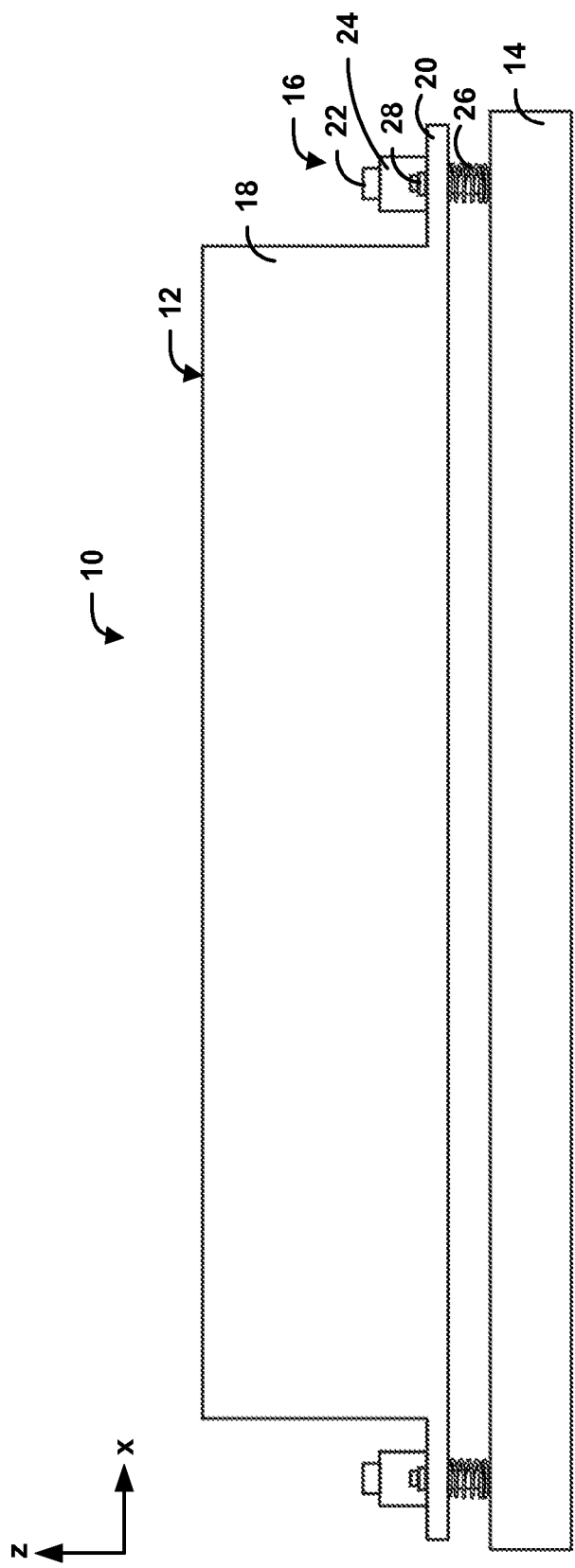
FIG. 2 is a schematic side view of the assembly illustrated in FIG. 1, which includes a chassis and a plurality of mounting systems.

FIG. 2 illustrates a schematic side view of assembly 10 (FIG. 1). In particular, FIG. 2 illustrates the interface between chassis 12 and mounting surface 14. Chassis 12 is coupled to mounting surface 14 via mounting systems 16, each of which includes bolt 22, dashpot 24, and spring 26.

As illustrated in FIG. 2, bolt 22 is oriented such that bolt 22 passes perpendicularly through mounting flange 20 of chassis 12. That is, in the side view illustrated in FIG. 2, mounting flange 20 extends outward from enclosure 18 in an x-axis direction and bolt 22 passes through mounting flange 20 along a z-axis direction. (Orthogonal x-z axes are shown in FIG. 2 for ease of description only.) In other examples, bolt 22 may pass through another portion of chassis 12, e.g., a portion of enclosure 18, in order to couple chassis 12 to mounting surface 14.

Figure 3:
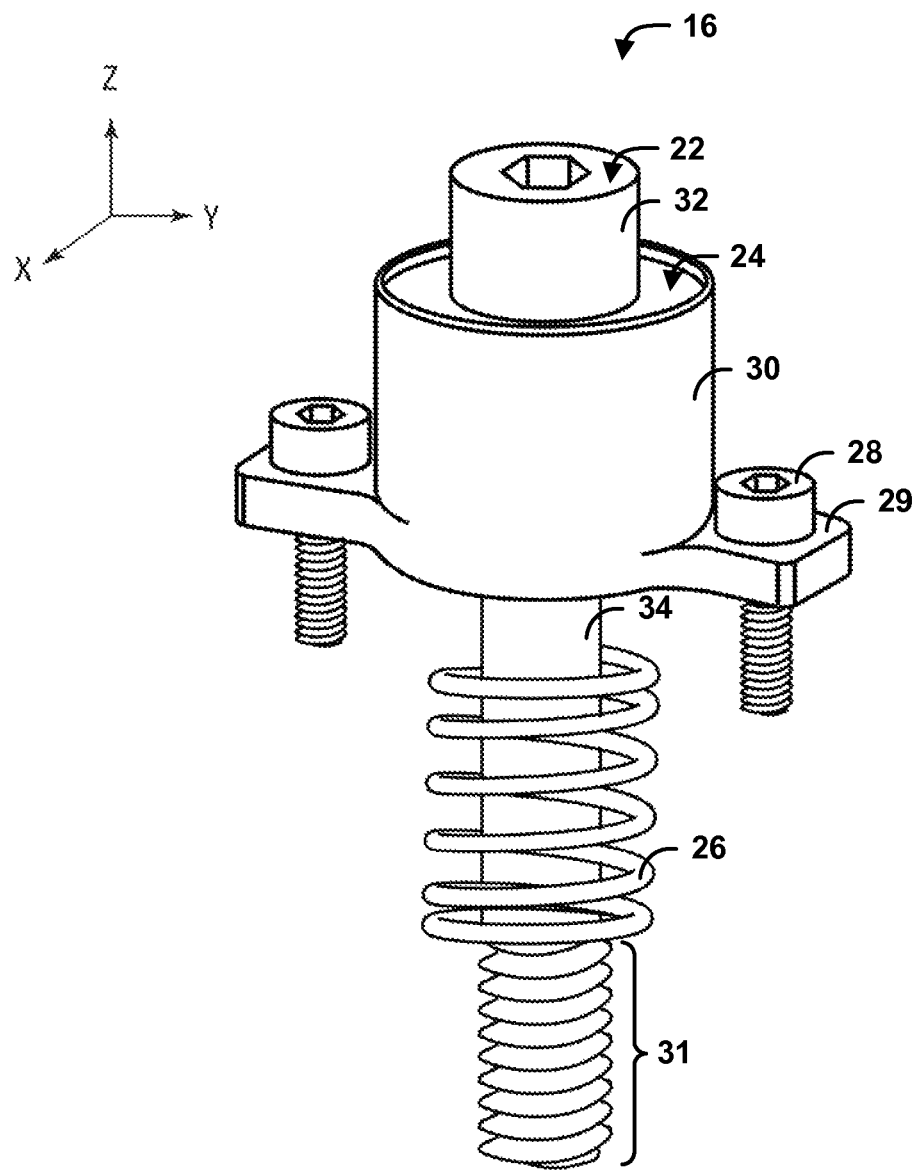
FIG. 3 is a schematic perspective view of a mounting system that includes a bolt, a dashpot, and a spring.

In some examples, bolt 22 includes a threaded portion (e.g., as illustrated in FIG. 3) that can be driven into mounting surface 14 in order to fasten chassis 12 to mounting surface 14. In these examples, mounting surface 14 defines threaded apertures into which the threaded portion of bolt 22 can be driven, e.g., using a tool such as a screwdriver or a drill. Mounting surface 14 may include a predefined configuration of apertures that corresponds to a configuration of mounting systems 16 on chassis 12. For example, the position of mounting systems 16 with respect to chassis 12 may be predetermined, e.g., mounting systems 16 may be positioned at each of the four corners of chassis 12. Consequently, four apertures can be drilled into four positions on mounting surface 14 that correspond to the positions of the mounting systems 16 at each of the four corners of chassis 12, e.g., the spacing of the apertures on mounting surface 14 is equivalent to the spacing of the mounting systems 16 on chassis 12. In other examples, apertures of mounting system 14 may be not be predefined, but instead, may be defined as bolts 22 are driven into mounting system 14.

In addition to bolt 22, each of mounting systems 16 includes dashpot 24 and spring 26. Dashpot 24 and spring 26 form a damping system that can dissipate at least some of the vibration forces transferred from mounting surface 14 to chassis 12. Dashpot 24 may be a linear dashpot, which is a mechanical device that resists motion via viscous friction.

Although not illustrated in FIG. 2, dashpot 24 includes a chamber filled with a viscous fluid. The viscous fluid can be, for example, a viscous gas or a viscous liquid (e.g., oil). In examples in which the viscous fluid comprises oil, the oil may have properties similar to those of hydraulic oil in order to facilitate dampening of the motion of dashpot 24 with respect to bolt 22. For example, in some examples, the oil may have a density between 0.8 and 0.9 grams per centimeter cubed. Additionally, in some examples, the oil can be mixed with one or more compressed gasses (e.g., compressed nitrogen), which may reduce foaming of the oil within the chamber of dashpot 24. In some examples in which the fluid-filled chamber contains both oil and compressed gas, approximately 75% of the chamber may contain oil and approximately 25% of the chamber may contain compressed gas. However, other ratios of oil and gas are contemplated.

The fluid-filled chamber of dashpot 24 surrounds a first portion of bolt 22 and is moveable relative to bolt 22. That is, the fluid-filled chamber of dashpot 24 is configured to move up and down in a substantially z-axis direction with respect to bolt 22, e.g., while bolt 22 remains substantially stationary. In addition to the fluid-filled chamber, dashpot 24 includes a flange that is coupled to bolt 22 on a portion of bolt 22 that is surrounded by the fluid-filled chamber. In this way, the flange may be disposed within the fluid-filled chamber of dashpot 24. The flange dampens the motion of the fluid-filled chamber relative to bolt 22 by moving up and down in the substantially z-axis direction within the viscous fluid of the fluid-filled chamber, increasing the viscous friction within the fluid-filled chamber.

As illustrated in FIG. 2, dashpot 24 is coupled to mounting flange 20 of chassis 12. In the example illustrated in FIG. 2, dashpot 24 is coupled to mounting flange 20 proximate to the upper surface of mounting flange 20, where the upper surface is defined as the surface of mounting flange 20 with the greatest z-axis position. However, in other examples, dashpot 24 may be coupled to mounting flange 20 proximate to the lower surface of mounting flange 20, where the lower surface is defined as the surface of mounting flange 20 with the smallest z-axis position. FIG. 2 illustrates auxiliary bolts 28 that couple dashpot 24 to mounting flange 20.

As previously mentioned, bolt 22 extends through mounting flange 20 and into mounting surface 14, with dashpot 24 surrounding a first portion of bolt 22 and spring 26 surrounding a second portion of bolt 22. Dashpot 24 is moveable relative to bolt 22 and, as a result of coupling of dashpot 24 to chassis 12, chassis 12 can move in synchrony with dashpot 24 relative to bolt 22 up and down in the substantially z-axis direction.

Spring 26 surrounds a second portion of bolt 22. In the example illustrated in FIG. 2, the second portion of bolt 22 is located below, e.g., at a smaller z-axis position than the first portion of bolt 22, i.e., the portion of bolt 22 which is surrounded by dashpot 24. Spring 26 extends between the lower surface of mounting flange 20 and the upper surface of mounting surface 14, where the upper surface of mounting surface 14 is defined as the surface of mounting surface 14 with the greatest z-axis position. In some examples, spring 26 is configured to remain rigid (e.g., in an uncompressed state) in a state in which no vibration forces are transferred from mounting surface 14 to chassis 12. Thus, in some examples, spring 26 is configured to remain substantially motionless until relatively high vibration motions of mounting surface 14 are transferred to spring 26.

Spring 26 absorbs at least some of the energy transferred from mounting surface 14 via the vibration forces and, consequently, is displaced with respect to bolt 22, e.g., moves up and down in the z-axis direction upon the application of vibration forces to mounting surface 14. The movement of spring 26 (e.g., indicated by a deflection along the z-axis direction relative to an uncompressed state) results in movement of chassis 12 with respect to bolt 22. That is, chassis 12 moves relative to bolt 22 and displacement of spring 26 relative to bolt 22 in a z-axis direction causes chassis 12 to be displaced in a z-axis direction because the energy absorbed by spring 26 from mounting surface 14 is transferred to chassis 12. In this way, spring 26 helps reduce at least some of the vibration energy transferred to chassis 12 from mounting surface 14.

Dashpot 24 can dampen the motion of chassis 12 that results from the displacement of spring 26. As discussed above, dashpot 24 includes a fluid-filled chamber and a flange. The flange is coupled to bolt 22 inside the fluid-filled chamber, and remains stationary relative to bold 22 while the fluid-filled chamber moves relative to bolt 22. In some examples, the flange extends outward from bolt 22 to increase the surface area of bolt 22 within the fluid-filled chamber, which causes an increase in viscous resistance. The fluid within the fluid-filled chamber interacts with the flange to slow the movement of the fluid-filled chamber with respect to bolt 22. In some examples, the fluid-filled chamber portion of the dashpot 24 is mechanically coupled to the chassis 12 and the remains fixed relative to chassis 12. Consequently, dashpot 24, including the fluid-filled chamber and the flange, dampens motion of chassis 12 that results from displacement of spring 26. In this way, dashpot 24 and spring 26 function in combination to isolate chassis 12 (and the electronic components contained within chassis 12) from the vibration forces experienced by mounting surface 14. In addition, the combination of dashpot 24 and spring 26 facilitates return of chassis 12 to its initial, stationary position relative to mounting surface 14 in a smooth manner after excitation of spring 26 by vibration forces. The initial position (also referred to as a nominal position) of chassis 12 can be, for example, the position of chassis 12 when no vibration forces are exerted on chassis 12 by mounting surface 14.

FIG. 3 illustrates a schematic perspective view of a mounting system 16 that includes bolt 22, dashpot 24, spring 26, and auxiliary bolts 28. FIG. 3 illustrates an example mounting system 16 prior to assembly of assembly 10 (FIGS. 1 and 2), e.g., prior to coupling of chassis 12 and mounting surface 14 via a plurality of mounting systems 16.

Figure 5:
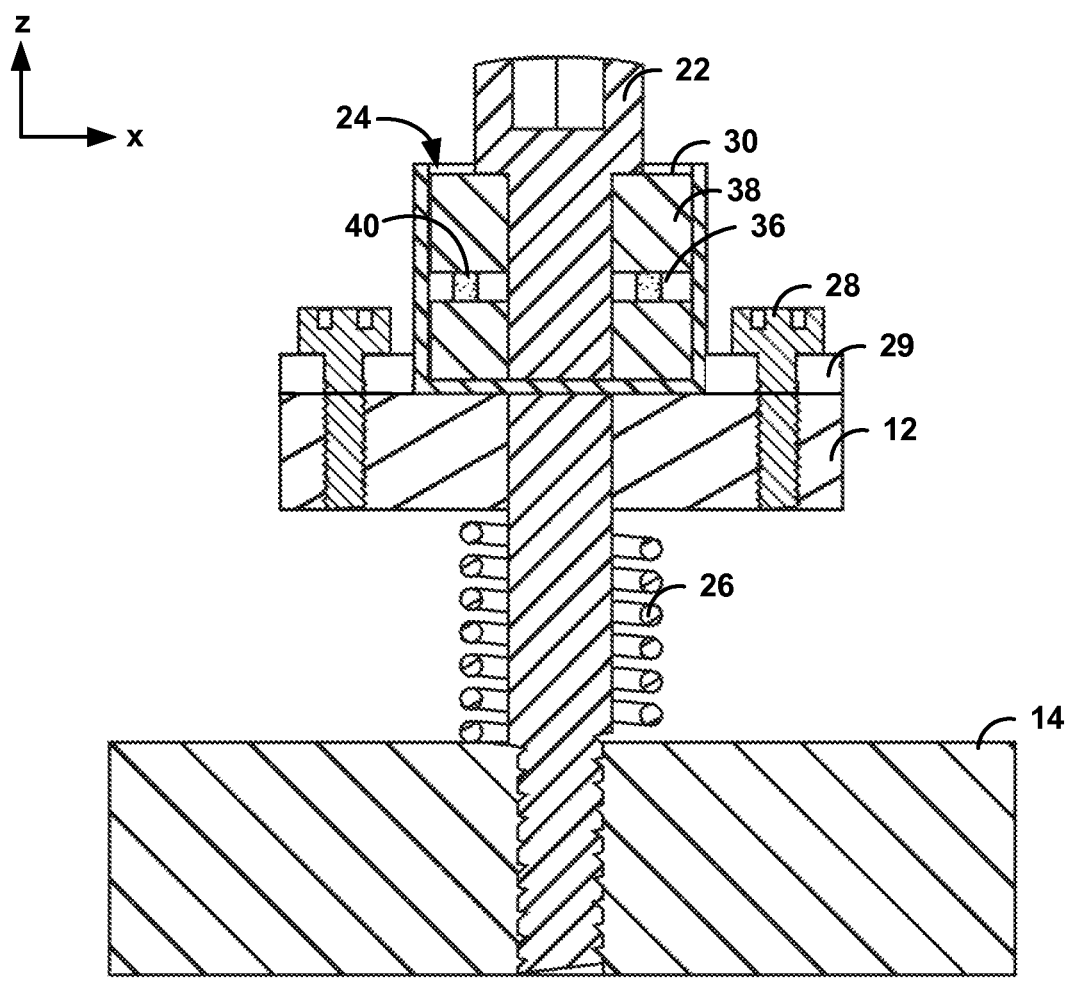
FIG. 5 is a schematic cross-sectional view of the assembly illustrated in FIG. 4, which includes a mounting system coupling a chassis to a mounting surface.

In the example illustrated in FIG. 3, mounting system 16 includes auxiliary bolts 28. Auxiliary bolts 28 couple dashpot 24 to chassis 12 in assembly 10. Dashpot 24 includes fluid-filled chamber 30, and auxiliary bolts 28 are configured to couple fluid-filled chamber 30 to chassis 12. For example, the threaded portion of auxiliary bolt 28 can be inserted into an aperture defined within chassis 12 in order to mechanically couple fluid-filled chamber 30 to chassis 12, e.g., as illustrated in FIG. 5. In this way, auxiliary bolts 28 fix a position of dashpot 24 relative to chassis 12.

In the example illustrated in FIG. 3, flanges 29 protrude from fluid-filled chamber 30. Flanges 29 each define an aperture into which a respective auxiliary bolt 28 can be inserted. Flanges 29 allow fluid-filled chamber 30 to be coupled to chassis 12 via auxiliary bolts 28. In addition to or as an alternative to auxiliary bolts 28, mounting system 16 can include another component suitable for coupling fluid-filled chamber 30 to chassis 12, such as an adhesive positioned between the bottom surface (as defined by the surface with the smallest z-axis position) of fluid-filled chamber 30 and the top surface of mounting flange 20 of chassis 12.

Fluid-filled chamber 30 surrounds a portion of bolt 22 and is moveable with respect to bolt 22. Fluid-filled chamber 30 can be formed from any material suitable for defining a space in which a viscous fluid, e.g., a viscous liquid or gas, can be contained. For example, fluid-filled chamber 30 can be formed from a non-porous material, e.g., a material that does not contain any openings, in order for the viscous fluid to be contained within the fluid-filled chamber 30. The material from which fluid-filled chamber 30 is defined can be selected to contain the viscous fluid, such that the viscous fluid to not leak out of the fluid-filled chamber 30. In some examples, fluid-filled chamber 30 is formed by more than one layer of material in order to increase the impermeability of fluid-filled chamber 30 to the viscous fluid contained within fluid-filled chamber 30.

Figure 4:
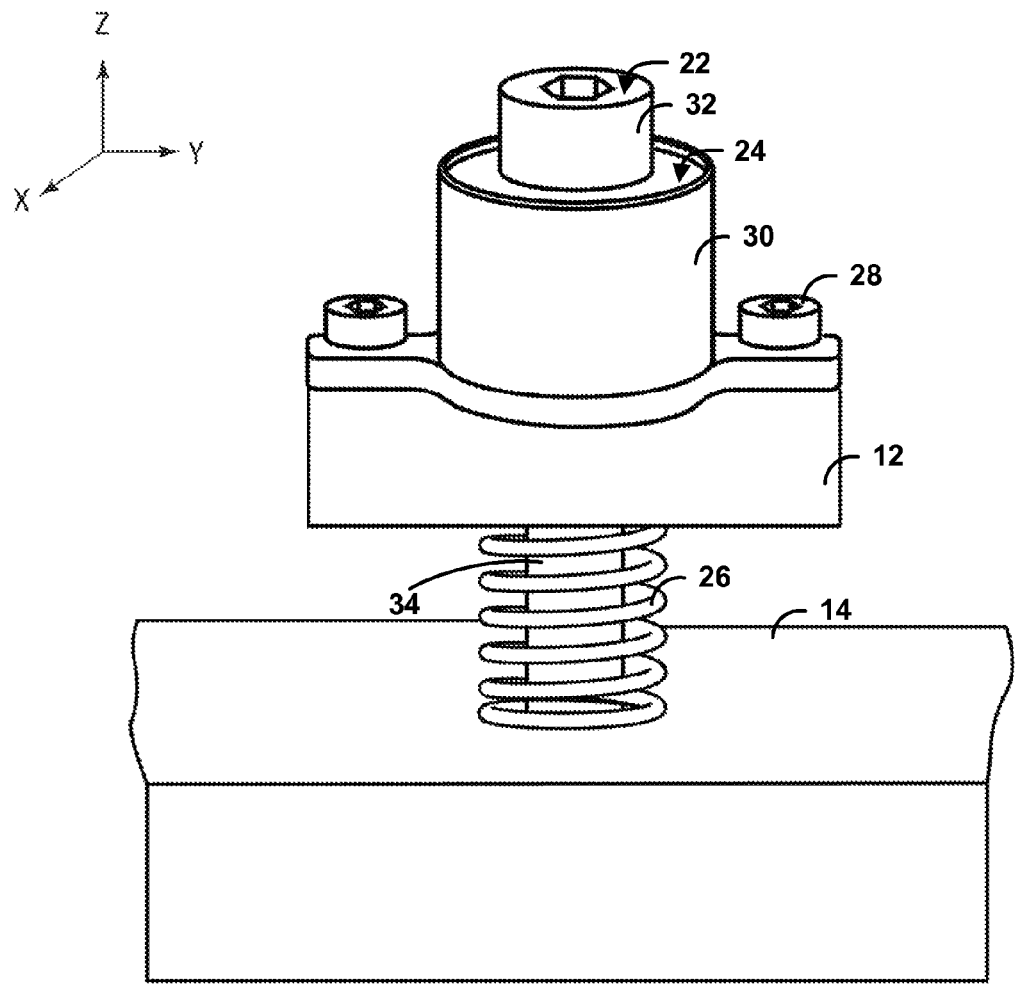
FIG. 4 is a schematic side view of an assembly that includes a mounting system coupling a chassis to a mounting surface. The mounting system includes a bolt, a dashpot, and a spring.

In some examples, fluid-filled chamber 30 defines a rigid outer shell that is filled with the viscous fluid. For example, fluid-filled chamber 30 can be formed from a rigid material that can be molded into a desirable configuration, such as a moldable plastic or metal material. Fluid-filled chamber 30 can have any configuration suitable for defining a chamber surrounding a portion of bolt 22 that can contain a viscous fluid. Although FIG. 4 illustrates a fluid-filled chamber 30 with a substantially cylindrical configuration, in other examples, fluid-filled chamber 30 may have another configuration, such as a substantially rectangular configuration. Fluid-filled chamber 30 can be formed from a material that facilitates any desirable configuration of fluid-filled chamber 30.

In addition, the materials used to form fluid-filled chamber 30 may be selected to be materials that resist damage sustained from the external environment or from the environment within fluid-filled chamber 30. For example, fluid-filled chamber 30 may be formed from a material that resists corrosion, e.g., damage that could result from exposure to external factors such as moisture or contaminants in the external environment or from exposure to the viscous fluid contained within fluid-filled chamber 30.

In some examples, fluid-filled chamber 30 may be formed from a metal, such as stainless steel, aluminum, brass, or copper. In other examples, the fluid-filled chamber 30 may be formed from a composite material, e.g., a material formed from two or more constituent materials, such as carbon fiber. In yet other examples, fluid-filled chamber 30 may be formed from a material such as beryllium, titanium, or a beryllium-aluminum alloy, e.g., AlBeMet®, made commercially available by Brush Wellman Inc. of Mayfield Heights, Ohio. In some examples, different portions of fluid-filled chamber 30 may be formed from different materials, e.g., fluid-filled chamber 30 may be formed from a variety of materials.

Fluid-filled chamber 30 can be sized to allow dashpot 24 to move up and down with respect to a selected portion of bolt 22. That is, fluid-filled chamber 30 can be configured to surround a selected amount of bolt 22 and another portion of bolt 22 can be void of fluid-filled chamber 30 in order to leave a margin for travel of fluid-filled chamber 30 and chassis 12 up and down with respect to bolt 22. Consequently, the dimensions, e.g., height (measured in the z-axis direction), of fluid-filled chamber 30 may be selected to accommodate a desired linear displacement of chassis 12. As discussed in further detail below, in some examples, a desired linear displacement of chassis 12 may be about 0.635 millimeters (mm) to about 6.35 mm (i.e., about 0.025 inches to about 0.25 inches).

In addition, as discussed previously, fluid-filled chamber 30 may contain a combination of oil and compressed gas. In these examples, the compressed gas may be introduced, e.g., injected, after sealing of fluid-filled chamber 30. Consequently, fluid-filled chamber 30 may be sized such that there is additional space within fluid-filled chamber 30 for the compressed gas. That is, the dimensions of fluid-filled chamber 30 may be selected such that fluid-filled chamber 30 can accommodate introduction of the compressed gas. In some examples, approximately 25% of the space within fluid-filled chamber 30 may be filled with compressed gas. However, other percentages of the space within fluid-filled chamber 30 may be selected to be filled with a compressed gas.

In the example illustrated in FIG. 3, bolt 22 includes head 32 and body 34. Head 32 is defined by the top-most portion of bolt 22, e.g., the portion of bolt 22 with the greatest z-axis position in FIG. 3 (orthogonal x-y-z axes are included in FIG. 3 for ease of description only). In the example illustrated in FIG. 3, head 32 is a substantially cylindrical segment of bolt 22 that has a larger diameter than body 34. In other examples, head 32 may have the same diameter as or a smaller diameter than body 34.

In examples in which the diameter of head 32 is larger than the diameter of body 34, e.g., the example illustrated in FIG. 3, head 32 is configured as a stop that helps prevent bolt 22 from sliding substantially entirely through fluid-filled chamber 30 when bolt 22 is positioned through fluid-filled chamber 30. For example, in some examples, fluid-filled chamber 30 defines an aperture through which bolt 22 is positioned. That is, bolt 22 extends through fluid-filled chamber 30 and, more specifically, through an aperture defined by fluid-filled chamber 30 that extends through the center of fluid-filled chamber 30 in a z-axis direction. In some examples, the aperture within fluid-filled chamber 30 may have substantially the same diameter as body 34 of bolt 22 or a diameter greater than body 34 and less than head 32 such that the aperture is configured to receive body 34 of bolt 22. Head 32 has a larger diameter and, consequently, is unable to be positioned within the aperture. Thus, head 32 prevents the entirety of bolt 22 from moving through the aperture within fluid-filled chamber 30. In the example illustrated in FIG. 3, the bottom surface of head 32 (as defined by the portion of head 32 with the smallest z-axis position) is positioned substantially flush with the top surface of fluid-filled chamber 30 (as defined by the portion of fluid-filled chamber 30 with the greatest z-axis position). However, other configurations between head 32 and fluid-filled chamber 30 are contemplated.

Body 34 includes threaded portion 31, which is defined by the bottom-most segment of bolt 22, e.g., the portion of bolt 22 with the smallest z-axis position in FIG. 3. Threaded portion 31 may be useful for attaching bolt 22 to mounting surface 14. For example, mounting surface 14 can define an aperture that is configured to accept threaded portion 31 of bolt 22. That is, the aperture within mounting surface 14 may also be threaded and threaded portion 31 of bolt 22 can mate with the threaded aperture within mounting surface 14 such that bolt 22 is coupled to mounting surface 14. Mounting surface 14 may define one or more apertures, and the apertures may be defined and arranged within mounting surface 14 in a configuration that corresponds to the configuration of mounting systems 16 within chassis 12. In other examples, mounting surface 14 does not include predefined apertures configured to receive bolt 22, and, instead, threaded portion 31 of bolt 22 is forced into mounting surface 14 during assembly of assembly 10 in order to attach chassis 12 to mounting surface 14. In some examples, in order to increase the strength of the mechanical connection created by bolt 22, threaded portion 31 may extend along a portion of bolt 22 that is at least 1.5 times the diameter of body 34 of bolt 22.

Bolt 22 can be formed from any material suitable for fastening chassis 12 to mounting surface 14. In some examples, bolt 22 is formed from a rigid material that can withstand relatively high mechanical force loading in order to provide a relatively secure mechanical connection between chassis 12 and mounting surface 14. That is, bolt 22 can be formed from a durable material selected to minimize the amount of damage sustained by bolt 22 as a result of application of mechanical forces from the external environment, e.g., as a result of high vibration forces. For example, in some examples, bolt 22 may be formed from a rigid metal material, e.g., steel or a steel alloy. In other examples, bolt 22 may be formed from a different material, such as plastic or wood.

As discussed with respect to FIG. 2, mounting system 16 also includes spring 26. As described in further detail below, spring 26 can have any suitable arrangement relative to mounting surface 14 and dashpot 24. For example, spring 26 may be positioned between chassis 12 and dashpot 24 in order to absorb energy generated by vibration of mounting surface 14.

As illustrated in FIG. 3, spring 26 is positioned such that spring 26 surrounds a portion of the body 34 of bolt 22 directly above (in a z-axis direction) threaded portion 31 of bolt 22. When mounting assembly 16 is coupled to chassis 12 and mounting surface 14 (e.g., as illustrated in FIGS. 1 and 2), spring 26 is positioned proximate to mounting surface 14 in order for spring 26 to be exposed to vibration forces sustained by mounting surface 14. Thus, as illustrated in FIG. 3, spring 26 is positioned directly above threaded portion 31 of bolt 22. Threaded portion 31 of bolt 22 can be received by mounting surface 14 to couple chassis 12 to mounting surface 14. With this configuration, spring 26 can directly contact mounting surface 14 upon integration of mounting system 16 into assembly 10.

As illustrated in FIG. 3, spring 26 is a coil or helical spring. For example, spring 26 can be a strand of material that is formed into the shape of a coil or a helix, and the coil configuration can result in spring 26 having elastic properties. That is, because of the coil configuration, spring 26 can be deformed, e.g., extended or compressed, upon application of a force and can revert to its original configuration upon removal of the force.

Spring 26 can be formed from any material suitable for storing energy transferred from mounting surface 14 and subsequently releasing the energy though displacement or motion of spring 26. For example, spring 26 can be formed from a metal, such as hardened steel, titanium, or copper. In other examples, spring 26 can be formed from a non-metallic material, such as a moldable plastic.

In some examples, spring 26 functions by remaining in a substantially uncompressed state or a state less than fully compressed until assembly 10 is subjected to sufficient vibration forces excite, e.g., induce motion of, spring 26. That is, in some examples, spring 26 has particular properties, e.g., is formed from particular materials or has a particular configuration, that cause spring 26 to remain rigid until absorbing sufficient energy from mounting surface 14 to convert the energy into motion. Specific properties for spring 26 can be selected based on a particular application, e.g., based on particular properties of mounting surface 14 and/or particular properties of dashpot 24.

Spring 26 can be formed with particular, predetermined material properties. For example, spring 26 can be selected to have a particular spring rate. The spring rate of spring 26 can be defined as the amount of weight needed to compress spring 26 a particular distance. Consequently, spring 26 characterized by a higher spring rate is defined by relatively more rigid properties of spring 26, e.g., vibration forces with a greater magnitude may be required to excite spring 26, while spring 26 characterized by a lower spring rate may be more flexible, e.g., more easily excitable.

The spring rate of spring 26 can be selected in any suitable manner. For example, in some examples, a mathematical approximation can be used to select the spring rate and, subsequently, to select or form spring 26 with the desired spring rate. As one example, Hooke's law of elasticity can be used to determine the desired spring rate based on the weight of chassis 12 and the desired linear displacement of chassis 12 in the z-axis direction. According to Hooke's law, the spring rate is substantially equal to the force exerted by the spring divided by the displacement of the spring. With respect to mounting system 16, Hooke's law can be applied such that the spring rate is equal to the force exerted on spring 26 by chassis 12 divided by the desired linear displacement of chassis 12. In some examples, the force exerted on spring 26 by chassis 12 is equal to the weight of chassis 12, e.g., the mass of chassis 12, multiplied by the acceleration of chassis 12. As one example, if mounting system 16 experiences no g-force loading, chassis 12 has a mass of approximately 4.5 kilograms, the gravitational acceleration on Earth is equal to approximately 9.8 meters per second squared, and the desired linear displacement of chassis 12 is approximately 0.003 meters, the desired spring rate is equal to approximately 14,700 Newtons per meter.

In some examples, chassis 12 has a mass between approximately 1.36 kilograms and approximately 45.4 kilograms (i.e., between approximately 3.5 pounds and approximately 100 pounds). The weight of chassis 12 is approximately equal to the mass of chassis 12 multiplied by the acceleration of chassis 12. In some examples, chassis 12 experiences high g-force loading, and the acceleration of chassis 12 can be defined by the g-forces experienced by chassis 12. For example, in some examples, chassis 12 may experience g-forces greater than 15 times, e.g., approximately 60 times, the acceleration due to Earth's gravity (e.g., greater than 15 times, e.g., approximately 60 times, 9.8 meters per second squared). Additionally, in some examples, such as in space applications of mounting system 16, the desired linear displacement of chassis 12 can be between approximately 0.000635 meters and approximately 0.00635 meters (i.e., between approximately 0.025 inches and approximately 0.25 inches). As discussed above, Hooke's law may be applied to mounting system 16 such that the spring rate is selected to be substantially equal to the weight of chassis 12 divided by the desired linear displacement of chassis 12. Consequently, employing the example values provided for the weight of chassis 12 and the desired linear displacement of chassis 12, in some examples, spring 26 may be selected with a spring rate between approximately 31,483.5 Newtons per meter and approximately 42,039,685.0 Newtons per meter. In order to help limit the spring constant, the distance of linear displacement of chassis 12 can be increased.

Although not visible from the perspective of FIG. 3, dashpot 24 also includes a flange that is coupled to the portion of body 34 of bolt 22 surrounded by fluid-filled chamber 30. The flange interactions with viscous fluid within fluid-filled chamber 30 to generate viscous friction within fluid-filled chamber 30 that dampens the motion of fluid-filled chamber 30 with respect to bolt 22. More specifically, the flange extends outward from around the portion of bolt 22 (as illustrated in FIG. 5) within fluid-filled chamber 30, which can effectively increase the surface area of bolt 22 within the fluid contained within chamber 30. The increased surface area of bolt 22 from the flange results in increased friction when fluid-filled chamber 30 moves up and down in the z-axis direction relative to bolt 22. The increased amount of friction results in damping of the motion of fluid-filled chamber 30 and, consequently, of chassis 12 when chassis 12 is mounted to fluid-filled chamber 30 in a substantially fixed position.

In order to contain the viscous fluid within fluid-filled chamber 30, the interface between fluid-filled chamber 30 and bolt 22 can be sealed by, for example, applying a sealing material, e.g., a sealant, to the interface. In some examples, the seal between fluid-filled chamber 30 and bolt 22 is hermetic, e.g., airtight. In other examples, the seal may be only partially hermetic.

Spring 26 and dashpot 24, which includes fluid-filled chamber 30 and the flange coupled to bolt 22 within fluid-filled chamber 30, function in combination to dampen motion of chassis 12 when chassis 12 is coupled to fluid-filled chamber 30 via auxiliary bolts 28. Spring 26 moves as a result of vibration forces sustained by mounting surface 14 and transferred to spring 26. When chassis 12 is mechanically coupled to fluid-filled chamber 30 and in a relatively fixed position with respect to chamber 30, the displacement of spring 26 causes chassis 12 and fluid-filled chamber 30 to move up and down in a z-axis direction along body 34 of bolt 22 (e.g., along a longitudinal axis of bolt 22, which may be oriented in the z-axis direction). The flange coupled to bolt 22 within fluid-filled chamber 30 increases the amount of viscous friction within fluid-filled chamber 30 and dampens, e.g., reduces, the motion of fluid-filled chamber 30 and, consequently, the motion of chassis 12 in order to reduce the forces exerted on electrical components mechanically coupled to chassis 12. In addition, spring 26, together with dashpot 24, may help chassis 12 to return to its initial, stable position along bolt 22. The initial position of chassis 12 may be the position in which no forces other than the weight of chassis 12 are exerted on spring 26. In some examples, spring 26 may be in a substantially uncompressed state when chassis 12 is in its initial position.

FIG. 4 illustrates a schematic side view of a mounting assembly 16 coupling chassis 12 to mounting surface 14. As illustrated, auxiliary bolts 28 couple chassis 12 to fluid-filled chamber 30 of dashpot 24 such that chassis 12 and chamber 30 are in substantially fixed positions to each other. In the example shown in FIG. 4, chassis 12 and chamber 30 are directly adjacent to each other. In addition, as illustrated in FIG. 4, in one example of assembly 10, spring 26 is positioned between chassis 12 and mounting surface 14.

Body 34 of bolt 22 extends downward in a z-axis direction from head 32. In the example illustrated in FIG. 4, only a portion of body 34 is visible within spring 26 because body 34 extends through apertures within fluid-filled chamber 30 and chassis 12. Body 34 passes through the central space defined by spring 26 and is inserted into mounted surface 14 in order to couple chassis 12 to mounting surface 14.

Vibration forces sustained by mounting surface 14 are directly transferred to spring 26 as a result of contact between spring 26 and mounting surface 14. For example, mounting surface 14 can be exposed to external forces, e.g., as a result of acceleration of an aircraft within which mounting surface 14 is contained, that cause mounting surface 14 to experience vibration forces. Mounting surface 14 may begin oscillating as a result of the vibration forces. Because spring 26 directly contacts mounting surface 14, spring 26 may experience the oscillations, and the energy from the vibration forces may be directly transferred to spring 26.

Spring 26 absorbs the vibration energy transferred from mounting surface 14. When the frequency of oscillations increases to a particular threshold value, e.g., a particular threshold value that is dependent on characteristics of spring 26 such as the spring rate, spring 26 also begins oscillating, e.g., moving at a particular frequency. In this way, the vibration forces sustained by mounting surface 14 are directly transferred to spring 26, and spring 26 converts the vibration energy into displacement or motion of spring 26.

Chassis 12 is mechanically coupled to fluid-filled chamber 30 of dashpot 24. Both chassis 12 and fluid-filled chamber 30 are moveable relative to bolt 22. For example, both chassis 12 and fluid-filled chamber 30 define apertures that are configured to accept bolt 22. Within the apertures, chassis 12 and fluid-filled chamber 30 are not rigidly coupled to bolt 22. Instead, chassis 12 and fluid-filled chamber 30 can freely slide up and down in a z-axis direction relative to bolt 22. As a result of mechanical coupling of chassis 12 to fluid-filled chamber 30, chassis 12 and fluid-filled chamber 30 slide up and down as a single unit relative to bolt 22.

As illustrated in FIG. 4, chassis 12 is in contact (e.g., direct or indirect) with the opposite side of spring 26 in some examples, e.g., the side of spring 26 that is not directly in contact with mounting surface 14. Consequently, if spring 26 begins to oscillate as a result of vibration energy from mounting surface 14, the vibration energy is directly transferred to the unit formed by chassis 12 and fluid-filled chamber 30 from spring 26 via the interface between spring 26 and chassis 12. The vibration energy transferred from spring 26 causes chassis 12 and fluid-filled chamber 30 to slide up and down relative to bolt 22.

As discussed in further detail with respect to FIG. 5, a flange is coupled to bolt 22 within fluid-filled chamber 30. In some examples, bolt 22 and the flange remain stationary, while fluid-filled chamber 30 can slide up and down in the z-axis direction with respect to bolt 22 and the flange. In other examples, bolt 22 and the flange can move with respect to fluid-filled chamber 30, while fluid-filled chamber 30 remains stationary. The flange extends outward from the portion of bolt 22 within fluid-filled chamber 30 (e.g., in a substantially x-axis direction, a substantially y-axis direction) and, in particular, into the viscous fluid contained within fluid-filled chamber 30. The flange within the viscous fluid facilitates dampening of the motion of chassis 12 and fluid-filled chamber 30. That is, the flange creates friction within the fluid-filled chamber 30 when the fluid-filled chamber 30 slides up and down. As a result of the increased friction within fluid-filled chamber 30, the rate at which fluid-filled chamber 30 and chassis 12 moves with respect to bolt 22 is reduced. This allows the unit of fluid-filled chamber 30 and chassis 12 to undergo movement along the z-axis direction having a lower frequency relative to an arrangement that did not include dashpot 24. In addition, because spring 26 may define an initial, resting position of chassis 12, spring 26 and dashpot 24 may help chassis 12 return to its initial, resting position, with little or no damage to the electronic components housed within chassis 12. In this way, chassis 12 and the electronic components housed therein are isolated from the vibration forces experienced by mounting surface 14.

FIG. 5 illustrates a schematic cross-section view of mounting assembly 16 coupling chassis 12 to mounting surface 14. In FIG. 5, the cross-section is taken along an x-z plane that bisects the side view illustrated in FIG. 4 of mounting assembly 16, chassis 12, and mounting surface 14. As FIG. 5 illustrates, flange 36 is mechanically coupled to bolt 22 and extends into fluid-filled chamber 30. Fluid-filled chamber 30 contains viscous fluid 38 through which flange 36 moves in order to dampen the motion of chassis 12.

As discussed with respect to FIG. 4, spring 26 absorbs energy generated by vibration of mounting surface 14 and releases the energy by oscillating in the z-axis direction. The energy from the oscillations of spring 26 is transferred to chassis 12 and causes fluid-filled chamber 30 and chassis 12 (which are coupled together) to move up and down in the z-axis direction with respect to bolt 22 and flange 36 (coupled to bolt 22).

In the example shown in FIG. 5, flange 36 is coupled to bolt 22 and extends outward from bolt 22 in an x-y plane. Flange 36 may have other configurations in other examples. Flange 36 may protrude from bolt 22 in any direction that extends outward from bolt 22 within fluid-filled chamber 30 to create resistance within viscous fluid 38 when fluid-filled chamber 30 moves up and down in a z-axis direction relative to bolt 22 and flange 36.

Flange 36 can be coupled to bolt 22 in any manner that provides a secure mechanical connection between flange 36 and bolt 22. That is, flange 36 and bolt 22 are coupled in a manner that allows flange 36 and bolt 22 to remain mechanically coupled when flange 36 is subjected to forces, e.g., torque, from movement of fluid-filled chamber 30 and viscous fluid 38 around flange 36. In some examples, bolt 22 and flange 36 are formed as a single unit. For example, bolt 22 and flange 36 can be formed using a moldable material, e.g., a moldable plastic or metal material, and can be molded such that bolt 22 and flange 36 form a single, continuous structure. In other examples, bolt 22 and flange 36 can be formed separately and can subsequently be mechanically coupled to one another. For example, in some examples, bolt 22 and flange 36 can be coupled using an adhesive applied at the interface between bolt 22 and flange 36. In other examples, bolt 22 and flange 36 can be coupled using another mechanism, e.g., a chemical reaction or welding via any suitable energy source (e.g., ultrasound, friction, or heat). For example, in examples in which bolt 22 and flange 36 are formed from metal materials, bolt 22 and flange 36 can be mechanically coupled using a process such as welding or soldering.

In some examples, flange 36 entirely surrounds bolt 22, e.g., flange 36 extends from a portion of bolt 22 around the entire circumference of bolt 22. In other examples, flange 36 only partially surrounds bolt 22. Further, in some examples, mounting system 16 includes only one flange 36 while, in other examples, mounting system 16 includes a plurality of flanges 36 coupled to bolt 22 within fluid-filled chamber 30. In examples in which mounting system 16 includes more than one flange 36, the flanges 36 can be coupled to bolt 22 at varying heights along the z-axis of bolt 22. That is, all of flanges 36 need not be positioned at the same height along bolt 22, where height can be defined as different points along bolt 22 with respect to the z-axis. Flanges 36 can be mechanically coupled to any portion of bolt 22 within fluid-filled chamber 30, such that flanges 36 create resistance within viscous fluid 38 when fluid-filled chamber 30 slides up and down with respect to bolt 22.

In some examples, flange 36 defines a substantially cylindrical extension of bolt 22. That is, flange 36 extends outward from bolt 22 along a portion of bolt 22 in a cylindrical configuration. In other examples, flange 36 may extend outward from bolt 22 in another suitable configuration. In some examples, the configuration of flange 36 may correspond to the configuration of fluid-filled chamber 30. For example, in the example illustrated in FIG. 5, flange 36 may define a substantially cylindrical configuration that corresponds (e.g., matches in the x-y plane) to the substantially cylindrical configuration of fluid-filled chamber 30. In other examples, fluid-filled chamber 30 may define another configuration and flange 36 may be configured to fit within fluid-filled chamber 30.

In some examples, flange 36 extends outward from bolt 22 entirely to the wall of fluid-filled chamber 30. In these examples, flange 36 may form a seal with the wall of fluid-filled chamber 30 such that viscous fluid 38 is substantially unable to flow between the outer edge of flange 36 and the inner wall of fluid-filled chamber 30. In these examples, flange 36 may define one or more apertures 40 that extend through flange 36 and that allow viscous fluid 38 to flow through in order for fluid-filled chamber 30 to slide up and down with respect to bolt 22 and flange 36. That is, in order for fluid-filled chamber 30 to freely slide up and down, viscous fluid 38 must flow through and/or around flange 36. Thus, in some examples, flange 36 defines apertures 40 through which viscous fluid 38 can flow.

In other examples, flange 36 extends only partially outward from bolt 22, e.g., does not extend entirely to the inner wall of fluid-filled chamber 30. In these examples, flange 36 may or may not define apertures 40 through which viscous fluid 38 can flow. That is, in examples in which space exists between flange 36 and the wall of fluid-filled chamber 30, flange 36 need not define apertures 40 through which viscous fluid 38 can flow because viscous fluid 38 is able to flow through the space between flange 36 and the wall of fluid-filled chamber 30. However, in some examples, flange 36 can additionally define apertures 40 through which viscous fluid 38 can flow.

In some examples, spring 26 and dashpot 24 can be selected with particular properties such that spring 26 and dashpot 24 operate in combination to dampen movement of chassis 12 relative to mounting surface 14, where the movement of chassis 12 may be driven by vibration forces transferred from mounting surface 14. For example, a particular spring 26 with particular properties may be selected in combination with a particular dashpot with particular properties. As one example, as discussed previously, the spring rate of spring 26 may be determined using the weight of chassis 12 and the desired linear displacement of chassis 12. In this way, spring 26 and dashpot 24 may be selected to have particular properties that together achieve desirable dampening results. In addition, in some examples, dashpot 24 may be adjustable such that adjusting dashpot 24 increases or decreases the ease with which flange 36 travels through the viscous fluid within fluid-filled chamber 30. An adjustable dashpot may be useful for, for example, fine tuning the dampening properties of dashpot 24.

In some examples, the extent to which spring 26 may absorb energy generated by vibration of mounting surface 14 may be based on particular material properties of spring 26. For example, spring 26 may be formed from a particular material with particular properties, e.g., strength, hardness, elastic modulus. Additionally or alternatively, spring 26 may be selected to have a particular configuration to control the amount of energy generated by vibration of mounting surface 14 and absorbed by spring 26. For example, spring 26 may have a particular coil configuration, e.g., may be coiled tightly or loosely. In some examples, spring 26 may be selected to have particular dimensions, e.g., a particular coil diameter. Based on the properties of spring 26, spring 26 is characterized by a particular spring rate.

In some examples, spring 26 may be selected to have a spring rate that corresponds to the weight of chassis 12. As previously mentioned, the spring rate of spring 26 is the amount of weight needed to compress spring 26 a particular distance. Consequently, spring 26 with a relatively higher spring rate is more rigid and consequently requires a chassis 12 of larger weight to compress spring 26 than a spring 26 with a relatively lower spring rate. Accordingly, in some examples, spring 26 may be selected to have a particular spring rate that corresponds to the weight of chassis 12.

In addition, dashpot 24 may be formed with particular characteristics in order to function in combination with spring 26 to help reduce motion of electronic components mechanically coupled to chassis 12. Vibration forces transferred from mounting surface 14 to spring 26 cause spring 26 to oscillate at a particular rate. The oscillatory motion from spring 26 is transferred to fluid-filled chamber 30 and chassis 12 coupled to fluid-filled chamber 30, causing the unit of fluid-filled chamber 30 and chassis 12 to oscillate, e.g., slide up and down in a substantially z-axis direction with respect to bolt 22. Dashpot 24, including fluid-filled chamber 30 and flange 36, dampens the motion of chassis 12 and fluid-filled chamber 30 such that the frequency of movement of chassis 12 and fluid-filled chamber 30 is reduced, and such that chassis 12 returns to a stationary position along bolt 22. Dashpot 24 can be formed with particular characteristics that correspond to characteristics of spring 26 in order to configure dashpot 24 to dampen at least some of the motion of chassis 12 generated by vibration of mounting surface 14.

For example, characteristics of flange 36 can affect the ability of dashpot 24 to dampen the motion of chassis 12. Flange 36 extends outward from bolt 22 along a segment of bolt 22, where the segment of bolt 22 covers a distance along the longitudinal axis (extending substantially along the z-axis direction) of bolt 22. In some examples, the length of the segment of bolt 22 that interfaces with flange 36 is equivalent to the thickness of flange 36 (where the thickness is measured substantially along the z-axis direction). In some examples, the thickness of flange 36 affects the amount of resistance provided within fluid-filled chamber 30. That is, a relatively thicker flange 36 may increase the resistance provided by flange 36 within viscous fluid 38. The increased resistance can result in slower motion of fluid-filled chamber 30 with respect to bolt 22, which can more quickly dampen the motion of chassis 12, in comparison to a thinner flange 36 that may not provide as much resistance within viscous fluid 38.

Similarly, the amount of resistance created by flange 36 can be affected by the surface area of flange 36 along the x-y plane that interacts with fluid 38 when flange 36 moves within chamber 30 in the substantially z-axis direction. The surface area may depend on, for example, the size of flange 36 along the x-y plane as well as the number and size of apertures 40 defined by flange 36. For example, a relatively larger number of apertures 40 defined by flange 36 can result in decreased resistance because less surface area of flange 36 interacts with fluids 38, such that relatively more viscous fluid 38 may flow through and around flange 38 within fluid-filled chamber 30. In a similar manner, relatively larger apertures defined by flange 36 can also result in decreased resistance because flange 36 allows relatively more of viscous fluid 38 to flow through the apertures. A decrease in the resistance within fluid-filled cavity 38 results in less dampening of the motion of chassis 12, which may result in more motion of chassis 12 and a longer period of time for chassis 12 to return to a stationary position. Thus, the number and size of apertures within flange 36 can be modified based on a desired damping effect on motion of chassis 12.

The viscosity of viscous fluid 38 can also affect the damping of motion of chassis 12 by dashpot 24. For example, viscous fluid 38 characterized by a relatively higher viscosity exhibits increased resistance to motion of flange 36 within viscous fluid 38. Consequently, mounting system 16 that includes viscous fluid 38 with a relatively higher viscosity results in relatively greater damping of motion of chassis 12 because fluid-filled chamber 30 slides up and down with respect to bolt 22 at a slower speed as a result of the increased resistance within fluid-filled chamber 30. In some examples, other characteristics of dashpot 24 can affect the damping of motion of chassis 12.

Figure 6B:
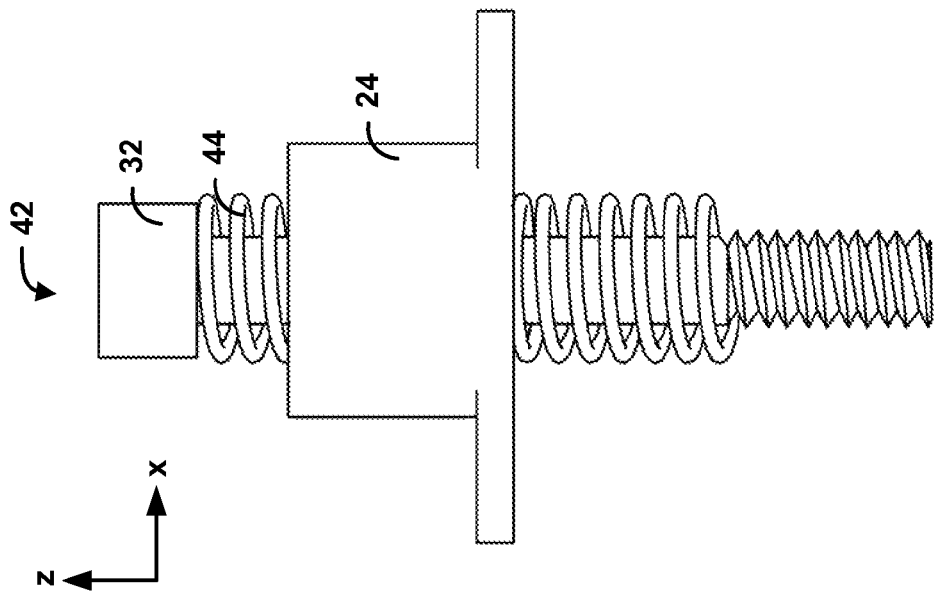
FIGS. 6A and 6B illustrate an alternative mounting system that includes a bolt, a dashpot, and two springs positioned on opposite sides of the dashpot.
Figure 6A:
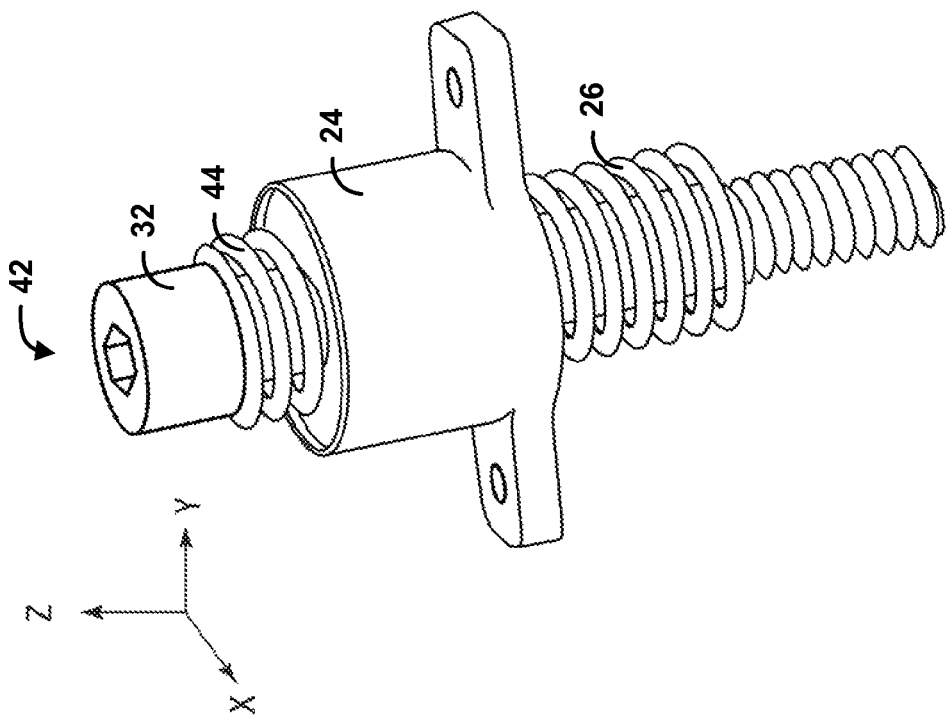

FIGS. 6A and 6B illustrate another example mounting system 42 that includes bolt 22, dashpot 24, and spring 26. In addition, mounting system 42 includes an additional spring 44 that is positioned between head 32 of bolt 22 and the top surface of dashpot 24 (where the top surface of dashpot 24 is defined as the surface of dashpot 24 with the greatest z-axis position). When chassis 12 is mechanically coupled to fluid-filled chamber 30, spring 26 and spring 44 are positioned on opposite sides of chassis 12 and dashpot 24.

Spring 44 positioned between head 32 of bolt 22 and top surface of dashpot 24 facilitates additional dampening of the motion of dashpot 24 upward and downward in a z-axis direction. For example, when chassis 12 is in motion in the general z-axis direction, the top surface of chassis 12 contacts spring 44 instead of head 32 of bolt 22. Because of the elastic properties of spring 44, spring 44 can absorb and dissipate more energy transferred from chassis 12, in comparison to head 32 of bolt 22.

Figure 7:
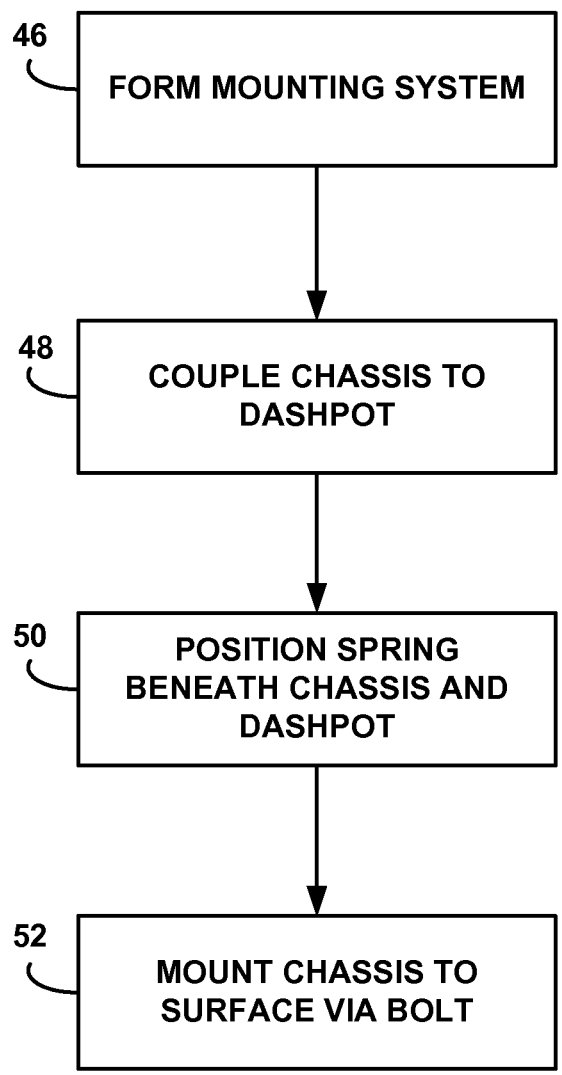
FIG. 7 is a flow diagram illustrating an example technique for forming an assembly that includes a chassis coupled to a mounting surface via a mounting system that includes a bolt, a dashpot, and a spring.

FIG. 7 is a flow diagram illustrating an example technique for forming an assembly, such as assembly 10 (FIGS. 1 and 2), that includes a chassis coupled to a mounting surface via a mounting system that includes a bolt, a dashpot, and a spring. While FIG. 7 is described with respect to assembly 10, the technique illustrated in FIG. 7 can be used to form another assembly that isolates a chassis from a mounting surface using a mounting system that includes a bolt, a dashpot, and a spring.

Mounting system 16 can be formed using any suitable technique (46). As described with respect to FIGS. 1-5, mounting system 16 includes bolt 22, dashpot 24, and spring 26. Dashpot 24 includes fluid-filled chamber 30 and flange 36. Flange 36 is coupled to bolt 22, and fluid-filled chamber 30 surrounds the portion of bolt 22 that is coupled to flange 36. Consequently, flange 36 is positioned within viscous fluid 38 that is contained within fluid-filled chamber 30. Fluid-filled chamber 30 of dashpot 24 is configured to be coupled to a chassis, such as chassis 12. Bolt 22 couples a chassis to a mounting surface, such as mounting surface 14.

Bolt 22 and flange 36 are coupled to one another. In some examples, bolt 22 and flange 36 are formed as a single, continuous structure while, in other examples, bolt 22 and flange 36 are constructed separately and subsequently mechanically coupled to one another. Bolt 22 and flange 36 can be formed using any suitable process. For example, in examples in which bolt 22 and flange 36 are made from metal, bolt 22 and flange 36 can be formed using any suitable manufacturing process, such as a molding or casting process. In examples in which the bolt 22 and flange 36 are formed as a single, continuous structure, a single cast or mold can be designed with a specific configuration that includes bolt 22 and flange 36, and the structure that includes bolt 22 and flange 36 can be molded or cast. In examples in which bolt 22 and flange 36 are constructed separately and subsequently mechanically coupled to one another, bolt 22 and flange 36 may be formed using separate casts or molds. Bolt 22 and flange 36 can subsequently be coupled to one another using any suitable material or method, e.g., an adhesive positioned at the interface between bolt 22 and flange 36, a chemical reaction used to create a mechanical connection between bolt 22 and flange 36 or a welding technique to weld bolt 22 and flange 36 together.

Fluid-filled chamber 30 can be attached to bolt 22 such that fluid-filled chamber 30 surrounds the portion of bolt 22 that is coupled to flange 36. For example, fluid-filled chamber 30 may define an aperture through the center of fluid-filled chamber 30 such that bolt 22 can extend through the aperture and extend through fluid-filled chamber 30. Fluid-filled chamber 30 contains viscous fluid 38 and, consequently, the interface between fluid-filled chamber 30 and bolt 22 may be sealed, e.g., via a hermetic or partially hermetic seal, such that viscous fluid 38 remains within fluid-filled chamber 30, e.g., does not leak out of fluid-filled chamber 30.

Chassis 12 is mechanically coupled to dashpot 24 and, more specifically, to fluid-filled chamber 30 of dashpot 24, in any suitable manner (48). For example, fluid-filled chamber 30 may include flanges 29 (FIG. 3) that define apertures for auxiliary bolts 28. Chassis 12 can define apertures configured to receive auxiliary bolts 28, and threaded portions of auxiliary bolts 28 can be positioned within the apertures in order to couple chassis 12 to fluid-filled chamber 30 and to fix the relative position between chassis 12 and chamber 30. Alternatively or additionally, chassis 12 can be coupled to fluid-filled chamber 30 in another manner. For example, in some examples, an adhesive can be applied between the bottom surface of fluid-filled chamber 30 and the top surface of chassis 12 in order to mechanically couple fluid-filled chamber 30 to chassis 12.

When chassis 12 and fluid-filled chamber 30 are coupled to one another, chassis 12 and fluid-filled chamber 30 form a unit that can freely slide with respect to bolt 22. In order to form the assembly illustrated in FIGS. 1, 2, 4, and 5, after chassis 12 is coupled to fluid-filled chamber 30, body 34 of bolt 22 is positioned into an aperture defined through the center of spring 26 beneath the portion of bolt 22 surrounded by chassis 12 and fluid-filled chamber 30 (50). That is, spring 26 is positioned to surround a portion of body 34 that is beneath the portion of bolt 22 surrounded by fluid-filled chamber 30 and chassis 12, e.g., spring 26 is positioned to surround a portion of body 34 that has a smaller z-axis position (x-, y-, and/or z-axes are shown for purposes of description in FIGS. 1-6) along an axis defined by body 34.

After spring 26 is positioned beneath chassis 12 and fluid-filled chamber 30, bolt 22 is coupled to mounting surface 14 (52). A length of bolt 22 is selected to accommodate both chamber 30 and spring 26, as well as securely fasten chassis 12 to mounting surface 14. In this way, chassis 12 is mounted to mounting surface 14 via bolt 22. In some examples, bolt 22 includes threaded portion 31 that is inserted into a predefined aperture within mounting surface 14. Threaded portion 31 includes threads that mate with threads within the aperture of mounting surface 14 in order to secure threaded portion 31 of bolt 22 within mounting surface 14. In other examples, the aperture defined by mounting surface 14 is defined by bolt 22 as it is introduced into mounting surface 14. In other examples, bolt 22 and/or mounting surface 14 may include an additional or alternative mechanism for coupling bolt 22 to mounting surface 14. For example, in some examples, an adhesive can be applied at the interface between mounting surface 14 and bolt 22 in order to couple bolt 22 to mounting surface 14.

Various examples have been described. These and other examples are within the scope of the following claims.

The invention claimed is:

1. A system comprising:
   a bolt including a head and a body, wherein the body comprises a first portion and a second portion, the first portion being between the head and the second portion, and wherein the second portion includes a threaded portion configured to be mechanically coupled to a mounting surface;
   a fluid-filled chamber comprising a viscous fluid, wherein the fluid-filled chamber at least partially surrounds the first portion of the bolt, and wherein the bolt extends entirely through the fluid-filled chamber and the fluid-filled chamber is configured to slide relative to the bolt;
   at least one flange extending from the first portion of the bolt into the fluid-filled chamber, wherein the at least one flange is configured to interact with the viscous fluid to dampen motion of the fluid-filled chamber relative to the bolt;
   a coil spring that at least partially surrounds the second portion of the bolt;
   a chassis mechanically coupled to the fluid-filled chamber, wherein the bolt is configured to mechanically couple the chassis to the mounting surface; and
   at least one printed board positioned within the chassis.

2. The system of claim 1, wherein the fluid-filled chamber defines an aperture having a first diameter, wherein the bolt defines a head and a body, wherein the head has a second diameter greater than the first diameter, wherein the body extends entirely through the aperture of the fluid-filled chamber, and wherein the head is positioned outside the fluid-filled chamber.

3. The system of claim 1, wherein the at least one flange and the bolt form a single, continuous structure.

4. The system of claim 1, wherein the at least one flange is mechanically coupled to the first portion of the bolt.

5. An assembly comprising:
   a bolt;
   a dashpot comprising:
     a fluid-filled chamber comprising a viscous fluid, wherein the fluid-filled chamber at least partially surrounds a first portion of the bolt and the bolt extends entirely through the fluid-filled chamber, and
     at least one flange extending from the first portion of the bolt into the fluid-filled chamber, wherein the at least one flange is configured to interact with the viscous fluid to dampen motion of the fluid-filled chamber relative to the bolt;
   a coil spring at least partially surrounding a second portion of the bolt;
   a chassis mechanically coupled to the fluid-filled chamber;
   at least one printed board positioned within the chassis; and
   a mounting surface, wherein the chassis is mechanically coupled to the mounting surface via the bolt, and the coil spring is between the chassis and the mounting surface, wherein the fluid-filled chamber is configured to slide relative to the bolt and the chassis is moveable relative to the bolt, and wherein the dashpot and the coil spring are configured to dampen vibration forces transferred from the mounting surface to the chassis.

6. The assembly of claim 5, wherein the first and second portions of the bolt are on opposite sides of the chassis.

7. The assembly of claim 5, wherein the fluid-filled chamber defines an aperture having a first diameter, wherein the bolt defines a head and a body, wherein the head has a second diameter greater than the first diameter, wherein the body comprises the first and second portions of the bolt, wherein the body extends entirely through the aperture of the fluid-filled chamber, and wherein the head is positioned outside the fluid-filled chamber.

8. The assembly of claim 5, wherein the dashpot and the spring are positioned on opposite sides of the chassis.

9. The assembly of claim 5, wherein the dashpot and the spring are positioned on a same side of the chassis.

10. The assembly of claim 5, wherein the at least one flange and the bolt form a single, continuous structure.

11. The assembly of claim 5, wherein the at least one flange is mechanically coupled to the first portion of the bolt.

12. A method comprising:
mechanically coupling a chassis to a dashpot via a bolt, the dashpot comprising a fluid-filled chamber comprising a viscous fluid, wherein the chassis and the chamber are configured to slide relative to the bolt, and wherein the bolt extends entirely through the fluid-filled chamber and the fluid-filled chamber at least partially surrounds a first portion of the bolt, the dashpot further comprising at least one flange extending from the first portion of the bolt into the fluid-filled chamber, wherein the at least one flange is configured to interact with the viscous fluid to dampen motion of the fluid-filled chamber relative to the bolt;

positioning a coil spring such that the coil spring at least partially surrounds a second portion of the bolt; and mechanically coupling the chassis to a mounting surface via the bolt, wherein, when the chassis is mechanically coupled to the mounting surface, the coil spring is between the chassis and the mounting surface, and wherein the dashpot and the coil spring are configured to dampen vibration forces transferred from the mounting surface to the chassis.

13. The method of claim 12, further comprising forming the dashpot by at least mechanically coupling the flange to the first portion of the bolt, positioning the fluid-filled chamber around the flange, and at least partially filling the fluid-filled chamber with the viscous fluid.

14. The method of claim 12, wherein the fluid-filled chamber defines an aperture having a first diameter, wherein the bolt defines a head and a body, wherein the head has a second diameter greater than the first diameter, and wherein mechanically coupling the chassis to the dashpot via the bolt comprises mechanically coupling the chassis to the dashpot such that the body extends entirely through the aperture of the fluid-filled chamber, and the head is positioned outside the fluid-filled chamber.

* * * * *